United States Patent
Wang

(10) Patent No.: US 11,165,120 B1
(45) Date of Patent: Nov. 2, 2021

(54) ENERGY STORAGE MODULE

(71) Applicant: High Tech Battery Inc., Taipei (TW)

(72) Inventor: Kuei Yung Wang, Taipei (TW)

(73) Assignee: HIGH TECH BATTERY INC.

( * ) Notice: Subject to any disclaimer, the term of this patent is extended or adjusted under 35 U.S.C. 154(b) by 0 days.

(21) Appl. No.: 17/177,889

(22) Filed: Feb. 17, 2021

(51) Int. Cl.
*H01M 10/613* (2014.01)
*H01M 10/647* (2014.01)
*H01M 10/658* (2014.01)
*H01M 50/211* (2021.01)
*H01M 10/6551* (2014.01)
*H01M 50/244* (2021.01)
*H01M 10/653* (2014.01)

(52) U.S. Cl.
CPC ....... *H01M 50/211* (2021.01); *H01M 10/613* (2015.04); *H01M 10/647* (2015.04); *H01M 10/653* (2015.04); *H01M 10/658* (2015.04); *H01M 10/6551* (2015.04); *H01M 50/244* (2021.01)

(58) Field of Classification Search
CPC ............. H01M 50/211; H01M 50/244; H01M 10/658; H01M 10/653; H01M 10/647; H01M 10/613; H01M 10/6551
See application file for complete search history.

(56) References Cited

U.S. PATENT DOCUMENTS

| | | | | |
|---|---|---|---|---|
| 2003/0185278 A1* | 10/2003 | Roepke | ............. | H01M 10/6235 374/152 |
| 2010/0104936 A1* | 4/2010 | Meintschel | ......... | H01M 10/625 429/120 |
| 2011/0151305 A1* | 6/2011 | Bolze | .................. | H01M 10/625 429/120 |
| 2021/0028517 A1* | 1/2021 | Choi | .................... | H01M 10/658 |

* cited by examiner

*Primary Examiner* — Muhammad S Siddiquee
(74) *Attorney, Agent, or Firm* — Ostrolenk Faber LLP

(57) ABSTRACT

An energy storage module that includes one or more cells, a body, and a cavity in the body. The body includes a first wall and a second wall arranged transversely to the first wall. The first wall and the second wall run parallel to an axis. The cavity contains the one or more cells and is at least partially defined by the first wall and the second wall. The first wall includes first and second heat conducting layers to form a first heat dissipating path in a first direction which extends transverse to the axis. The second wall includes first and second heat insulating layers to form a heat conduction barrier for preventing heat dissipation in a second direction that extends transverse to the first direction and the axis.

18 Claims, 13 Drawing Sheets

ENERGY STORAGE MODULE

TECHNICAL FIELD

The invention relates to an energy storage module such as but not limited to a pouch cell energy storage module.

BACKGROUND

Performance of an energy storage module can be greatly affected by external temperature of the environment in which the module is arranged as well as internal temperature of the module. Temperature fluctuation external to the energy storage module includes the fluctuation of the ambient temperature. For example, cool or cold air surrounding the energy storage module may lower the activity of the ions in the cells of the module thereby resulting in an increase in the internal resistance. The increase in internal resistance would adversely affect the discharge of the energy storage module and cause power loss. An increase in ambient temperature would decrease the internal resistance. However, an excessively hot ambient temperature may adversely affect the balance in the chemistry of the cells in the module and promote unwanted side reactions that degrades the performance of the module (e.g., cause loss of capacity and power). If the temperature of the module is out of control, thermal runaway may be triggered, which may lead to self-ignition and even explosion in some cases. It is thus important to maintain an optimal temperature for the energy storage module to function properly. Temperature fluctuation internally of the module requires attention as well. During charging and discharging of the energy storage module, heat is generated and accumulated in the module. The high temperature will lower the operational efficiency of the energy storage module and will damage the core of the energy storage module. This is especially the case in energy storage module with battery stack.

Heat dissipation in energy storage module are usually implemented by way of structural design. One existing design includes networks of air ducts in specifically arranged to bring about convention for cooling the energy storage module. Such design involves complicated structural arrangement, which sometimes results in uneven heat dissipation with evident temperature difference between different cells or thermal gradient across the cells in the energy storage module.

SUMMARY OF THE INVENTION

According to a first aspect of the invention there is provided an energy storage module comprising one or more cells; a body having a first wall and a second wall arranged transversely to the first wall, the first wall and the second wall running parallel to an axis; and a cavity in the body containing said one or more cells, the cavity being at least partially defined by the first wall and the second wall; wherein the first wall includes first and second heat conducting layers to form a first heat dissipating path in a first direction which extends transverse to the axis; and the second wall includes first and second heat insulating layers to form a heat conduction barrier for preventing heat dissipation in a second direction that extends transverse to the first direction and the axis. Preferably, the second heat conducting layer is the only layer between the cavity and the first heat conducting layer. More preferably, the second heat conducting layer is electrically insulating. Yet more preferably, the body is configured to promote heat dissipation in a third direction which extends parallel to the axis. It is preferable that the body includes a heat conducting connector for connecting said one or more cells to the first heat conducting layer thereby forming a second heat dissipation path that at least partially extends in the third direction. Advantageously, the heat conducting connector includes a coupling portion for coupling with the first heat conducting layer, at least the coupling portion is electrically insulating. More advantageously, the heat conducting connector includes an electrically conducting portion for establishing direct connection with said one or more cells. Yet more advantageously, the body includes a third wall arranged parallel to the first wall, the third wall includes first and second heat conducting layers to form part of the first heat dissipating path in the first direction. Preferably, the body includes a heat conducting connector for connecting said one or more cells to the first heat conducting layer thereby forming a second heat dissipation path that at least partially extends in the third direction. More preferably, the heat conducting connector includes an electrically conducting portion sandwiched between two coupling portions that are electrically insulating. Yet more preferably, the heat conducting connector is in fixed connection with the first heat conducting layer. Advantageously, the first heat conducting layer is formed from metal. More advantageously, the second heat conducting layer is formed from a material selected from a group consisting of silicone, heat conductive rubber and a mixture thereof. Yet more advantageously, the second heat insulating layer is formed from a material selected from a group consisting of Bakelite, glass fiber, foam, inorganic composite material and a mixture thereof. More preferably, the first wall is in connection with a fluid heat exchanger for facilitating heat dissipation from the first wall.

In a second aspect of the invention there is provided an energy storage module comprising a frame; a plurality of cells arranged in the frame, the cells being in face-wise contact with each other to form a stack; wherein the frame includes a heat dissipation structure in contact with each of the cells to facilitate heat transfer between the cells and the frame along a first direction, and a heat insulation structure in face-wise contact with the two outer-most cells of the stack to prevent heat transfer between the cells and the frame in a second direction different from the first direction. Preferably, the first direction and the second direction are substantially orthogonal. More preferably, the heat dissipation structure comprises: a thermally conductive wall with one or more material layers; a heat sink; or both. More preferably, the heat insulation structure comprises a pair of thermally insulating walls one adjacent each of the two outer-most cells of the stack, each of the thermally insulating wall including one or more material layers. Yet more preferably, the cells are pouch cells.

BRIEF DESCRIPTION OF DRAWINGS

The invention will now be described, by way of example only, with reference to the accompanying drawings, in which.

DETAILED DESCRIPTION OF PREFERRED EMBODIMENT

Figure 1:
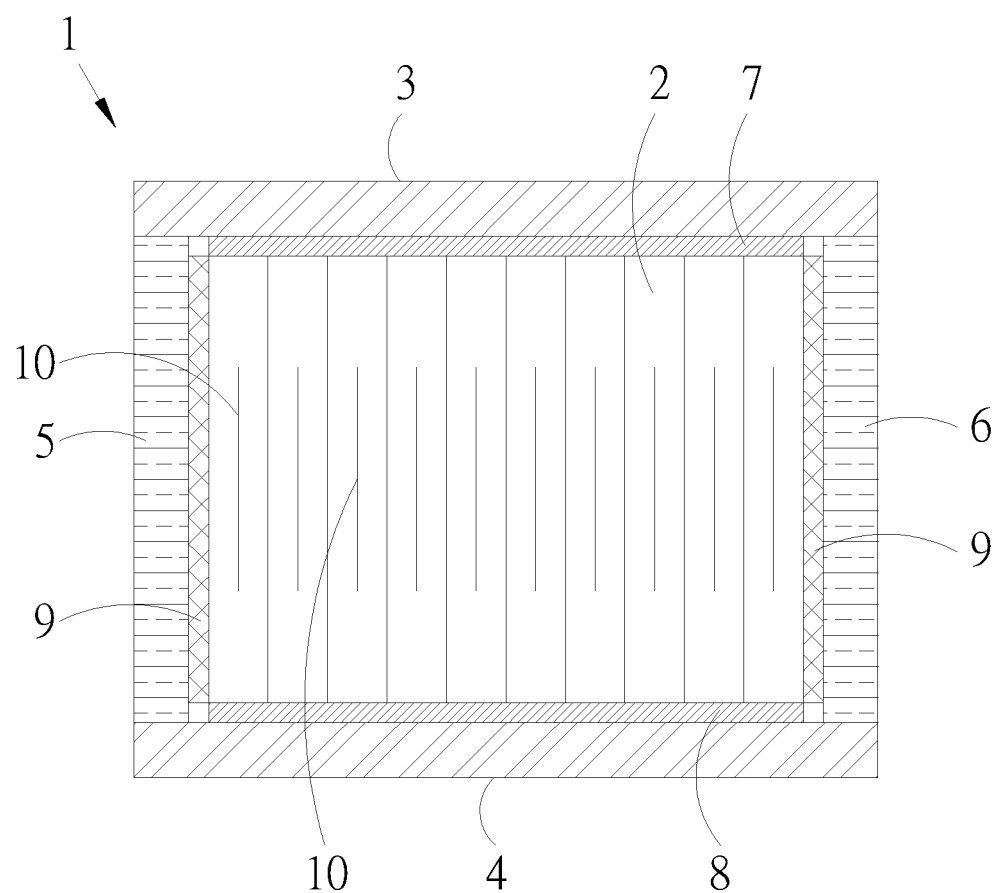
FIG. 1 is a front view of an energy storage module in the form of a high-density pouch cell energy storage module in one embodiment of the invention.
Figure 2:
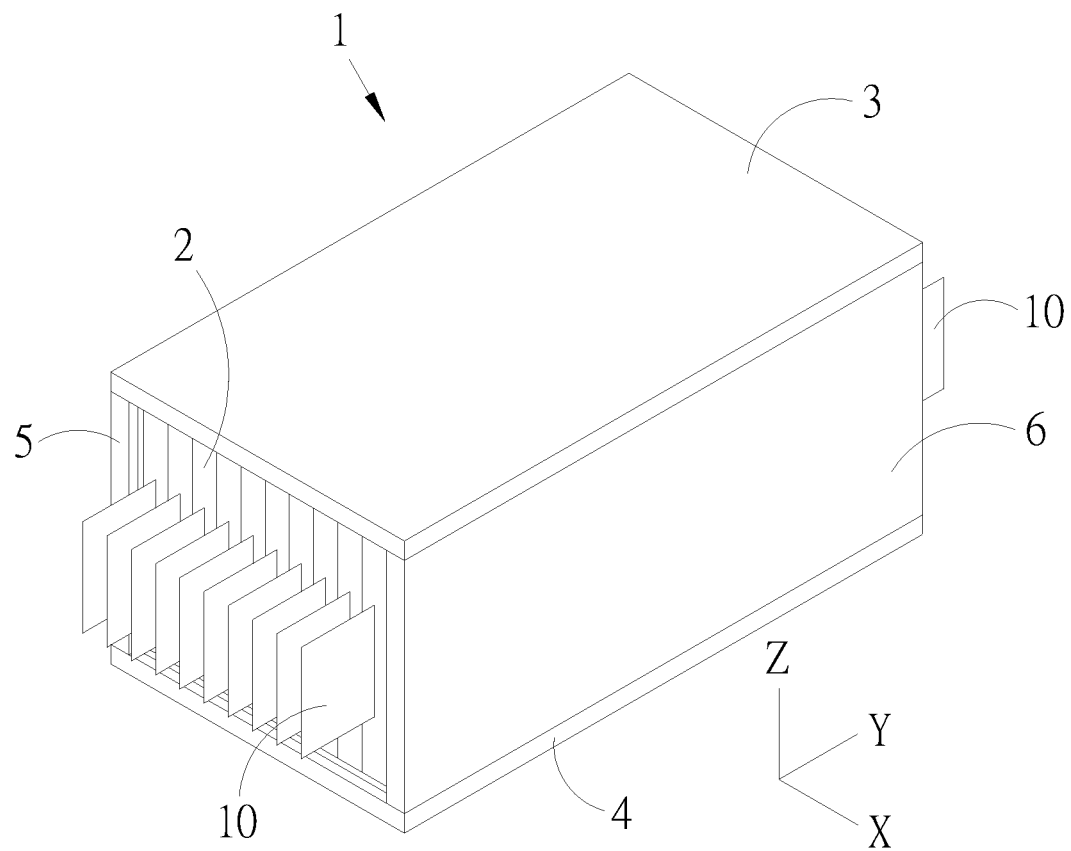
FIG. 2 is a perspective view of the energy storage module of FIG. 1.

Referring to FIGS. 1 and 2, there is shown an embodiment of an energy storage module 1 in the form of a pouch cell energy storage module. The energy storage module 1 includes a plurality of pouch cells 2 arranged side-by-side in alignment with one another along a width of the energy storage module 1 in an X direction (second direction). Each of the pouch cells 2 include edge(s) and opposing faces (flat, convex, concave, etc.). The cells 2 are arranged such that the faces of the cells 2 are in face-wise contact. In this embodiment, the face-wise contact involves a full contact between opposing faces of adjacent cells however in some other embodiments the face-wise contact could involve at least some direct contact between opposing faces of adjacent cells. As shown in FIG. 2, the energy storage module 1 has a length along an axis extending in a Y direction (third direction) and a height along an axis extending in a Z direction (first direction). Referring to the frame of reference of FIG. 2, the energy storage module 1 is configured to promote heat dissipation in Z direction and Y direction while discourage heat conduction in X direction.

Figure 12:
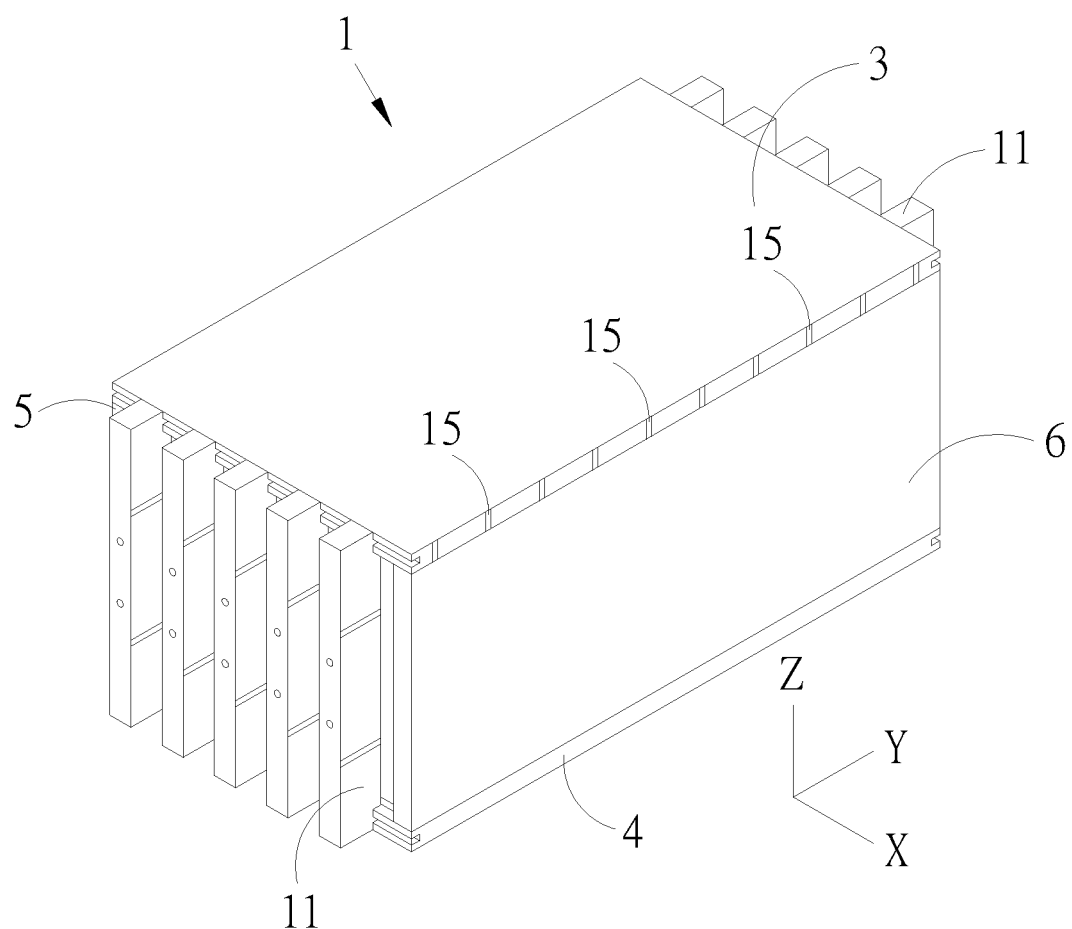
FIG. 12 is a perspective view of the energy storage module of FIG. 9 with an upper metal plate acting as a fluid heat exchanger making use of liquid as the medium for heat exchange.
Figure 13:
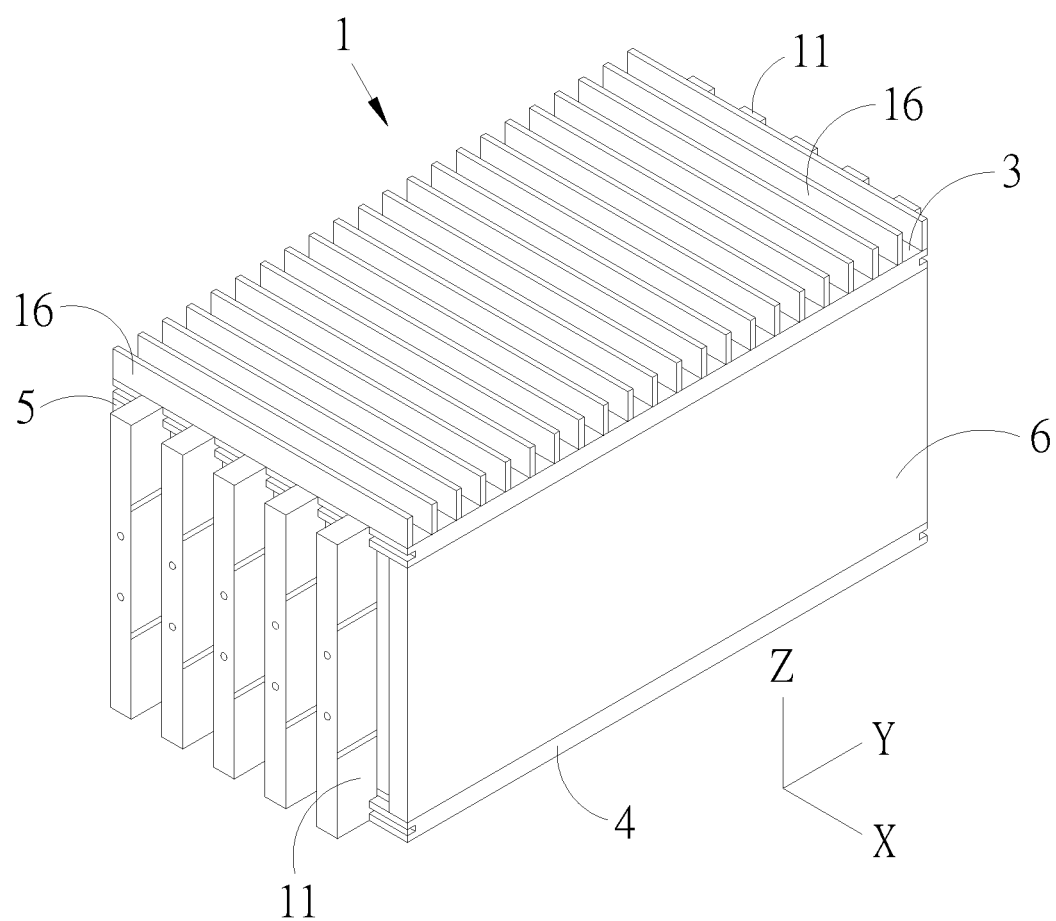
FIG. 13 is a perspective view of the energy storage module of FIG. 9 with an upper metal plate acting as a fluid heat exchanger making use of gas as the medium for heat exchange.

The energy storage module 1 includes a body or frame with top (first wall/third wall), left (second wall), right (second wall) and bottom sides (first wall/third wall) that collectively surround the cells 2. Each of the top, left, right and bottom sides includes two layers of materials. Each of the cells 2 has two ear lugs 10 on opposite sides of the cell and all ear lugs 10 on the same side of the cells 2 are arranged in parallel alignment to each other. On the top side (first wall/third wall) of the cells 2, there is an upper heat-conducting layer 7 in the form of a heat-conducting and electrically non-conducting pad and above which is an upper metal plate 3. Below the cells 2 at the bottom side (first wall/third wall), there is a lower heat-conducting layer 8 in the form of a heat-conducting pad and below which is a lower metal plate 4. The heat-conducting layer 7 is placed between the edges of the cells 2 and the metal plate 3. The heat-conducting layer 8 is placed between the edges of the cells 2 and the metal plate 4. In the embodiments shown in FIGS. 12 and 13, the upper metal plate 3 may include or be a fluid heat exchanger such as liquid heat exchanger or gas heat exchanger to promote heat dissipation. The liquid heat exchanger in FIG. 12 includes various liquid passages 15 in which liquid coolant may flow. The gas heat exchanger in FIG. 13 includes a plurality of parallel plates 16 arranged to form gas passages in which gaseous coolant may flow. On the left side (second wall) of the cells 2, a layer of heat insulator 9 is sandwiched between the cells 2 and an outer protector 6. On the right side (second wall) of the cells, another layer of heat insulator 9 is sandwiched between the cells and the outer protector 5.

The layers of heat insulators 9 can be formed using sponge materials, silicon rubber (e.g., polyurethane, chloroprene rubber, styrene butadiene rubber, polyethylene), foam material (e.g., phenolic resin foam, polyethylene foam material, PVC foam, etc.), or any of their combination. As seen from FIG. 2, the energy storage module 1 is relatively compact.

The heat-conducting layers 7 and 8 are in direct contact or engagement with the respective metal plates 3 and 4, which are respectively larger than the heat-conducting layers 7 and 8. More specifically, an entire outer surface of the heat-conducting layers 7 and 8 are in direct contact with the inner surface of the respective metal plates 3 and 4. This maximizes the surface area for heat conduction between the heat-conducting layers 7 and 8 and the metal plates 3 and 4. This arrangement enables heat from the cells 2 to be evenly and efficiently conducted away from respective center of the cells 2 towards the respective metal plates 3 and 4. Additional material layer(s) between the heat-conducting layer 7 or 8 and the metal plate 3 or 4 could potentially hinder heat conduction so, in a preferred embodiment, the heat-conducting layer 7 or 8 is the only layer or sole layer between the cells 2 and the metal plates 3 or 4. As such, the size of the energy storage module 1 is reduced. Heat dissipation and conduction in the Z direction is promoted by the aforementioned arrangement. The heat-conducting layers 7 and 8 can be of any shape and can be formed (e.g., molded) with any surface patterns. For example, the heat-conducting layers 7 and 8 can be sized and shaped to correspond closely with the shape of the cells 2 for improved thermal contact to facilitate heat transmission. The heat-conducting layers 7 and 8 are electrically insulating and may be formed from any heat conducting electric insulator such as silicone or heat conductive rubber. Such heat-conducting layers 7 and 8 are recyclable as they are not bonded to the cells 2 but are independent layers in the form of gaskets being placed on top and bottom of the cells 2 and are shaped to closely resemble that of the cell 2 for better heat conduction.

Inner surfaces of the metal plates 3 and 4 may be flat. Alternatively, inner surfaces of the metal plates 3 and 4 may be shaped (e.g., textured, corrugated, with grooves, with channels, with hexagonal honeycomb structure, etc.) to create gaps between the heat-conducting layers 7 and the metal plate 3 or to create gaps between the heat-conducting layer 8 and the metal plate 4. In some cases, the edges of the cells 2 in contact with the heat-conducting layer 7 or 8 may include a seam or seal line or other irregularities, which may hinder proper (e.g., full) contact of the edges of the cells 2 with the heat-conducting layer 7 or 8. The gaps between the heat-conducting layers 7 and the metal plate 3 or 4 or between the heat-conducting layer 8 and the metal plate 4 facilitates proper (e.g., full) contact of the edges of the cells 2 with the heat-conducting layer 7 or 8, by allowing the relatively flexible heat-conducting layer 7 or 8 to be compressed by the seam or seal line or other irregularities into the gaps such that the layer 7 or 8 can assume close or full contact with the cells 2 and the metal plates 3, 4 to facilitate heat transfer.

Figure 3:
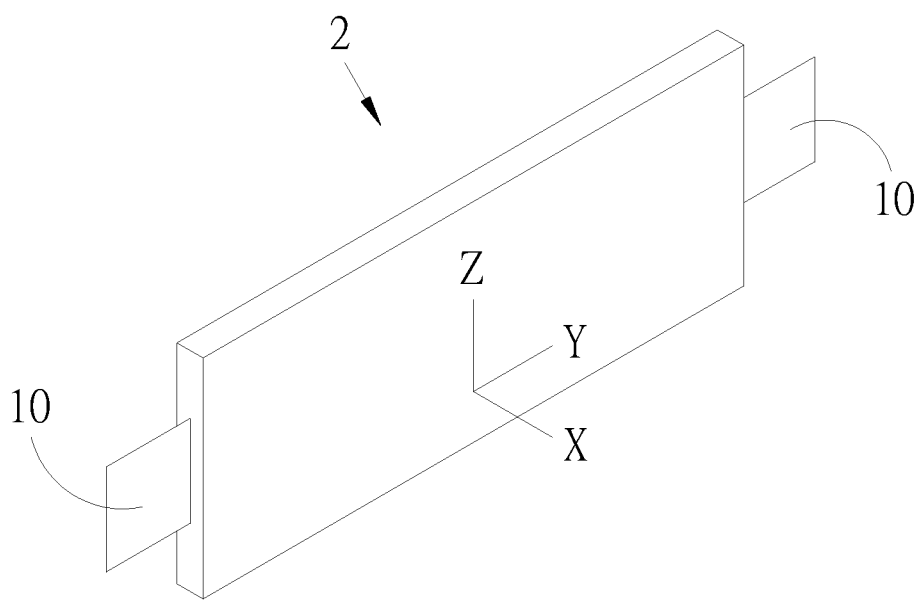
FIG. 3 is a perspective view of one of the cells in the energy storage module of FIG. 1.
Figure 4:
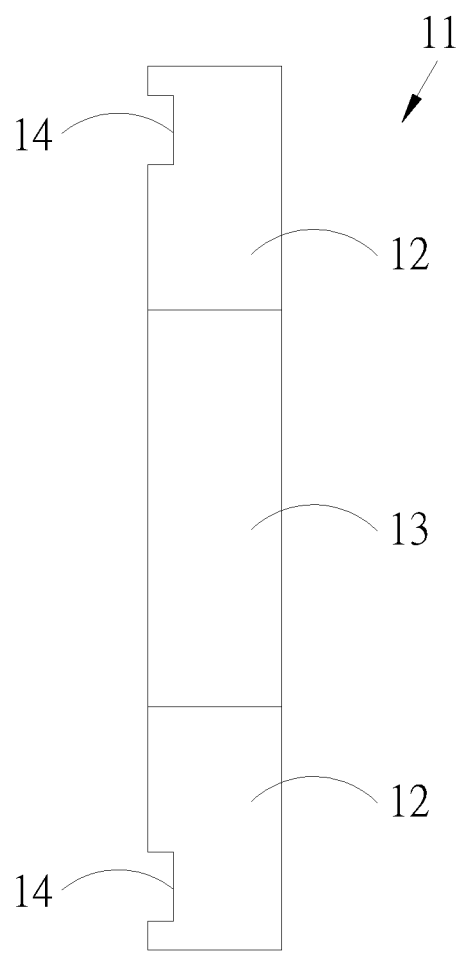
FIG. 4 is a side view of a first connector for connecting terminals of the cells in the energy storage module of FIG. 1.
Figure 5:
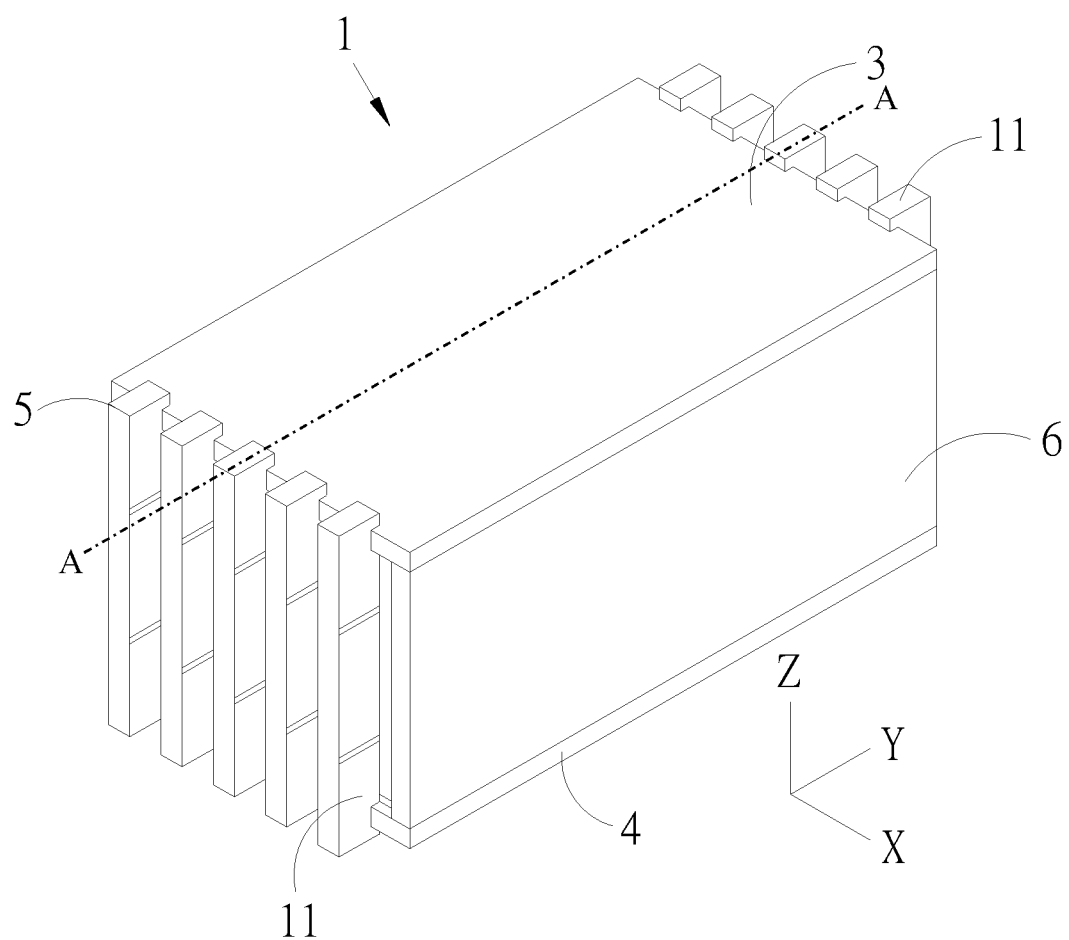
FIG. 5 is a perspective view of the energy storage module of FIG. 1 in which terminals of the cells are connected with the connectors of FIG. 4.
Figure 6:
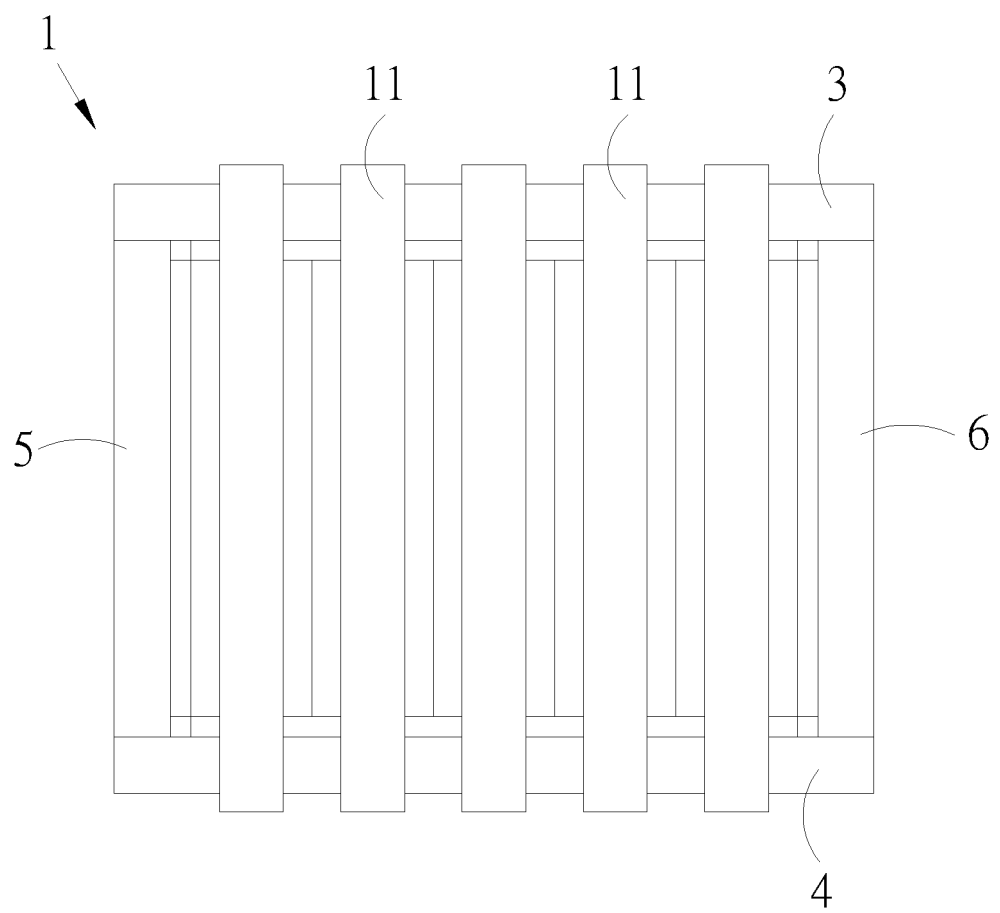
FIG. 6 is a front view of the energy storage module of FIG. 5.
Figure 7:
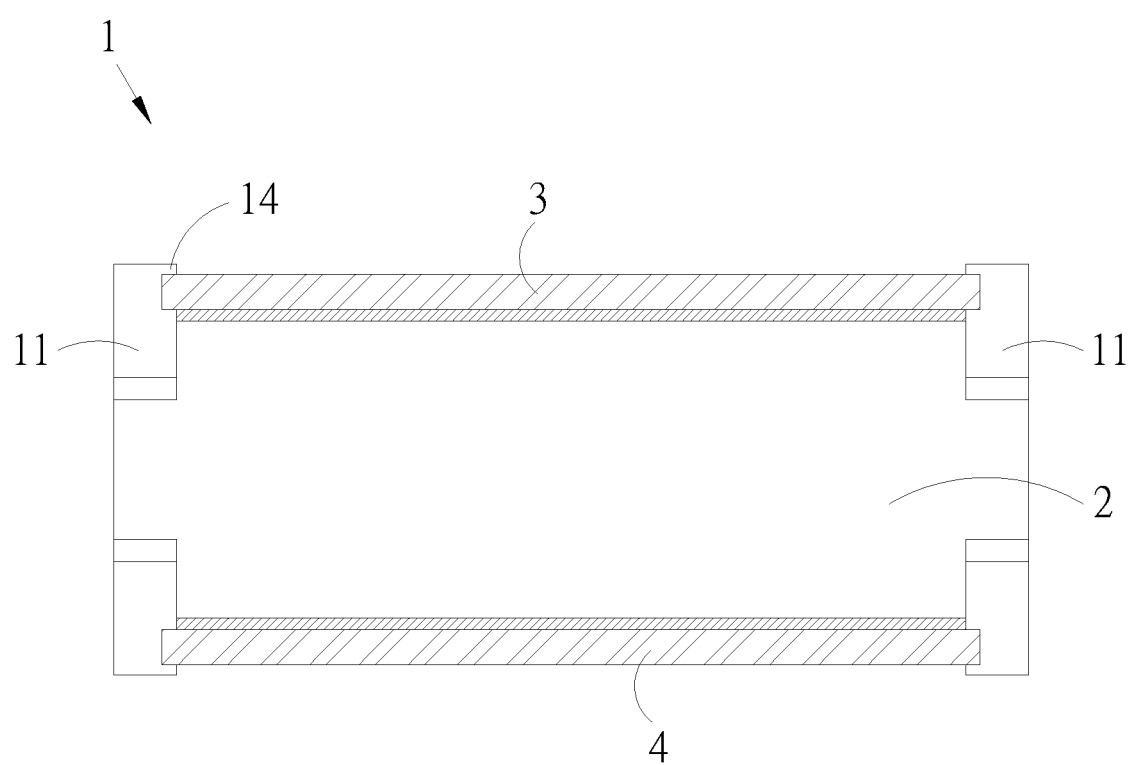
FIG. 7 is a cross-sectional view of the energy storage module of FIG. 5 taken along line A-A in FIG. 5.
Figure 8:
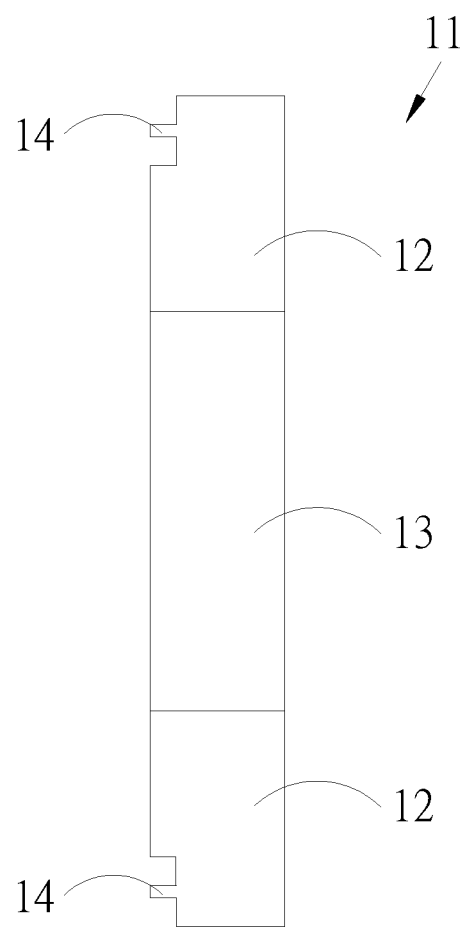
FIG. 8 is a side view of a second connector for connecting terminals of the cells in the energy storage module in FIG. 1.
Figure 9:
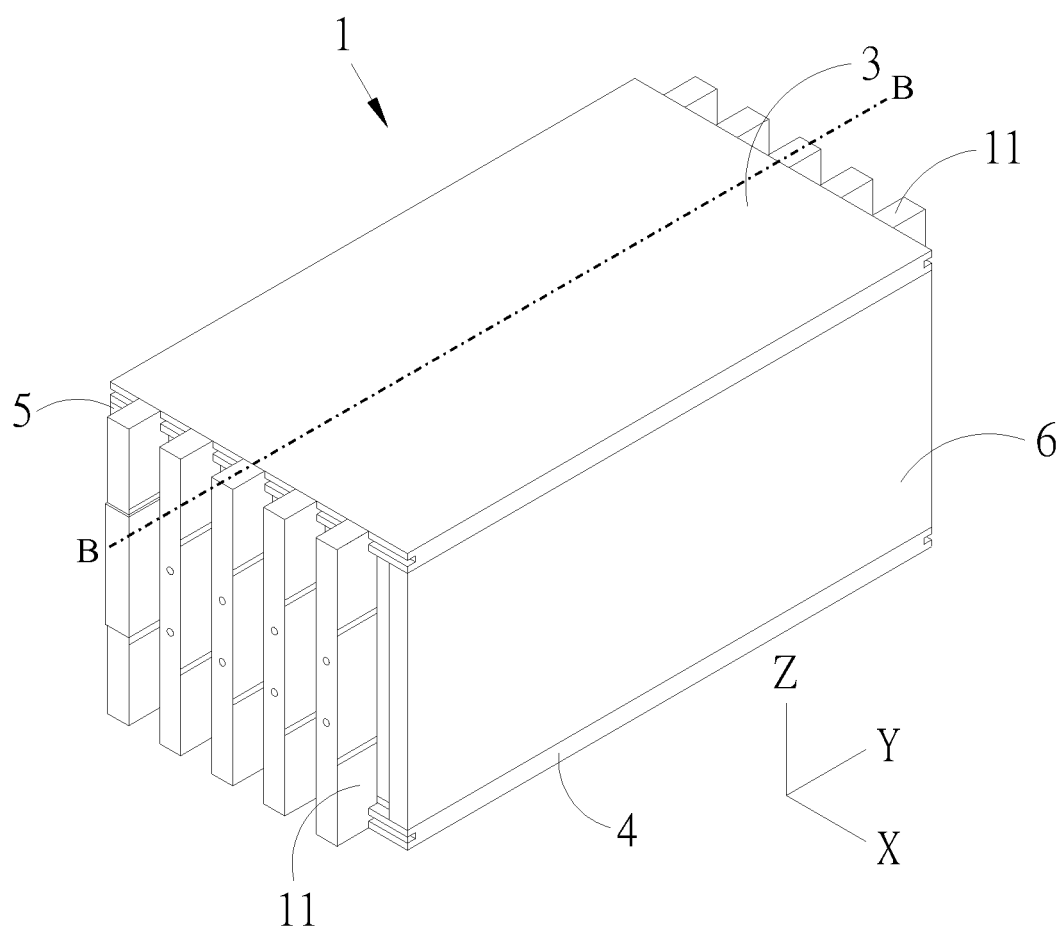
FIG. 9 is a perspective view of the energy storage module of FIG. 1 in which terminals of the cells are connected with the connectors of FIG. 8.
Figure 10:
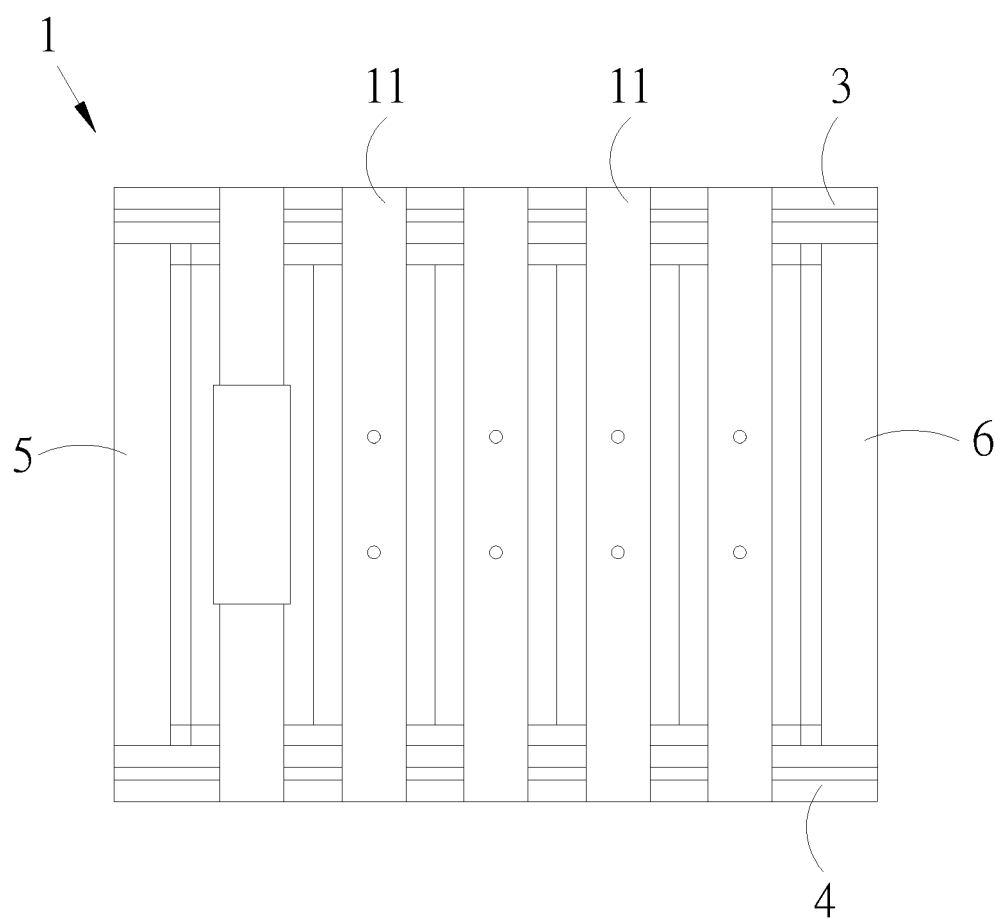
FIG. 10 is a front view of the energy storage module of FIG. 9.
Figure 11:
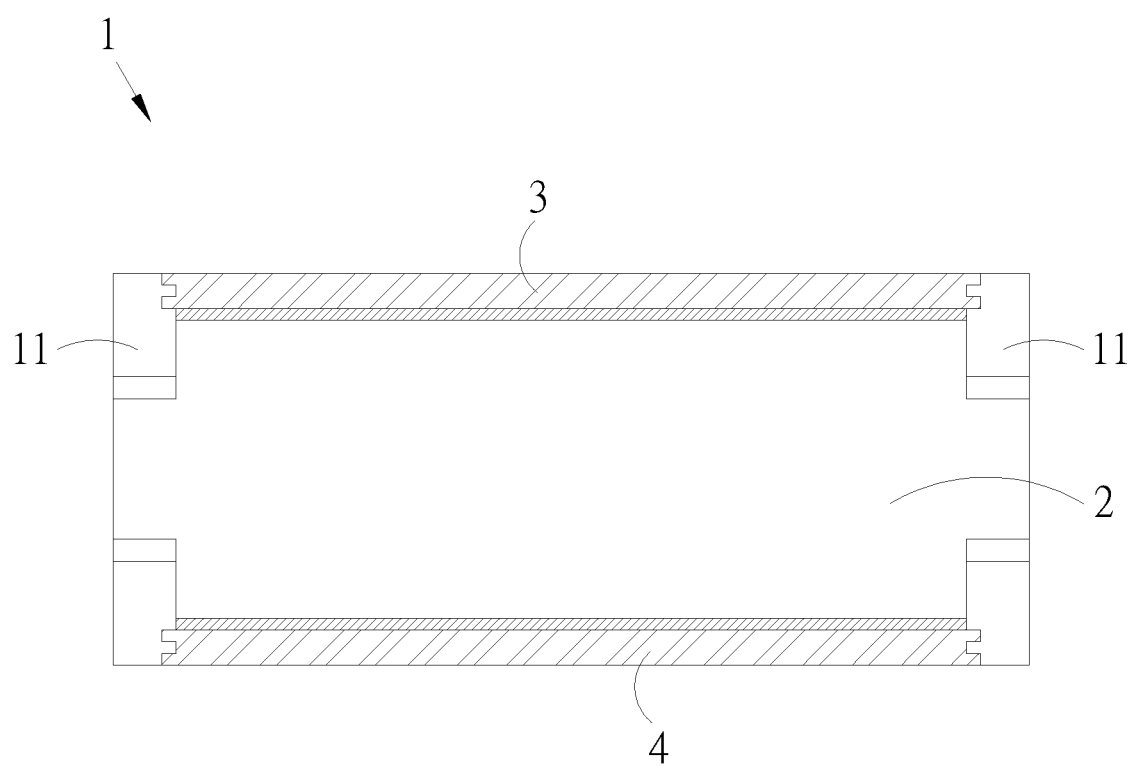
FIG. 11 is cross-sectional view of the energy storage module of FIG. 9 taken along line B-B in FIG. 9.

With reference to FIG. 3, opposite ends of the cell 2 are provided with ear lugs 10, one on each end. To promote heat dissipation and conduction in the Y direction, two connectors 11 are provided on respective ends to directly conduct heat from the respective ear lugs 10 of each cell 2 to the metal plates 3 and 4. FIGS. 4 and 8 show two embodiments of the connector 11. The connectors 11 in these embodiments share three common structures, namely, a heat conducting and electrically insulating upper coupler 12, a heat and electrically conducting portion 13, and a heat conducting and electrically insulating lower coupler 12. The upper coupler 12 and the lower coupler 12 each has a coupling portion 14 that is configured to engage and couple with the upper and lower metal plates 3 and 4 respectively. The portion 13 is in direct contact with the ear lug 10 of a cell 2. The ear lug 10 is attached to the portion 13 in the X or Y direction by way of, for example, mechanical locking, fastening using fasteners, riveting or welding. In one example, the ear lug 10 is an L-shaped member with a first plate-like portion extending in X direction and connected to portion 13 and a second plate-like portion extending in Y direction and from the first plate-like portion. In another example, the ear lug 10 is a plate like member extending in X direction and connected to portion 13. The portion 13 may be made of metal. Heat from the cell 2 travels to the upper metal plate 3 through the ear lug 10 to the portion 13 via the upper coupler 12. The heat from the cell 2 can also travel to the lower metal plate 4 through the same ear lug 10 to the portion 13 via the lower coupler 12. The upper and lower couplers 12 are made of a material that is electrically insulating to avoid short circuit during charging and discharging of the cell 2.

Referring to FIGS. 4 to 7, the coupling portions 14 each includes a recess configured to accommodate an edge of the upper or lower metal plate 3 or 4. The coupling portions 14 fix the position of the ear lugs 10 relative to the upper and lower metal plates 3 and 4. With reference to FIGS. 8 to 11, each of the coupling portions 14 has a shape that correspond to the shape of the edge of the respective metal plates 3 and 4. As shown in the cross-sectional view of FIG. 11, the coupling portions 14 have corrugated cross-sectional shape that matches the corrugating cross-sectional shape of the edge of the metal plates 3 and 4.

Again the main purpose of the coupling portions 14 are to connect with the metal plates 3 or 4 and to fix the position of the cell 2 relative to the metal plates 3 and 4. The embodiments are only examples to show the possible shapes of the coupling portions 14. It is not the intention of the inventors to limit the shape of the coupling portions 14 to those as shown in the specific embodiments.

With reference to FIG. 1, the cells 2 are packed in the body closely and side-by-side. The two cells 2 at the lateral ends of the energy storage module 1 along direction X are covered by respective heat insulator pads 9. These insulator pads 9 are isolated from the external environment by left and right outer protectors 6 and 5. This arrangement prevents heat conduction from the cells 2 in the direction X thereby prevent heat from the cells 2 to be conducted in a sideway direction towards the outer protectors 5 and 6. The insulator pads 9 are formed from heat insulating materials such as Bakelite, glass fiber, foam and/or inorganic composite material. The insulator pads 9 together with the outer protectors 6 and 5 form a heat conduction barrier or heat insulator that lowers the temperature difference between cells 2 and the environment outside of the energy storage module 1 thereby lowers, and if possible prevents, sideway heat conduction. Sideway conduction will result in uneven heat distribution amongst the cells 2. Cells 2 closer to the outer protectors 6 and 5 would be cooler than the cells 2 at the center of the energy storage module 1. Heat conduction between cells 2 may lead to uneven heat distribution or heat dissipation amongst the cells 2. Temperature difference between the cells 2 lowers the performance of the cells 2. Direct conduction from a cell 2 to the heat-conduction layer 7 or 8 would be most effective way of heat dissipation without affecting the temperature of neighboring cells 2. The temperature differences between the cells 2 is kept to a minimum to ensure consistency in performance amongst the cells 2 and enhance the life cycle of the energy storage module 1.

The above embodiments of the invention are advantageous in that the heat conduction arrangement of the cells in the energy storage module encourages heat transfer in one or more directions and discourages heat transfer in one or more other directions, thus effectively controlling heat flow in the module. The energy storage module, in particular its heat conduction arrangement, has a relatively simple structure, is safe in operation, and can be made compact, hence can operate cost effectively. In some embodiments in which the energy storage module includes a stack of cells, heat transfer from one cell via one or more other cells to the body of the module, or from the body of the module to one cell via one or more other cells can be prevented. This reduces the chance of a temperature gradient being built up across (some or all of) the cells, which would adversely affect performance or lifespan of the cells.

The invention has been given by way of example only, and various other modifications of and/or alterations to the described embodiment may be made by persons skilled in the art by employing the aforementioned features of the embodiments of the invention without departing from the scope of the invention as specified in the appended claims. For example, the energy storage module may be a battery pack. The energy storage module may include any number of cells that can be of different chemistries. The cell(s) can be pouch cell(s), cylindrical cell(s), button cell(s), prismatic cell(s), etc. The energy storage module and its components can take shapes, sizes, forms, etc., different from those illustrated. The skilled person could appreciate that heat transfer will occur based on temperature gradient and hence may occur both ways depending on the temperature difference.

The invention claimed is:

1. An energy storage module comprising:
   one or more cells;
   a body having a first wall and a second wall arranged transversely to the first wall, the first wall and the second wall running parallel to an axis; and
   a cavity in the body containing said one or more cells, the cavity being at least partially defined by the first wall and the second wall;
   wherein the first wall includes first and second heat conducting layers to form a first heat dissipating path in a first direction which extends transverse to the axis; and the second wall includes first and second heat insulating layers to form a heat conduction barrier for preventing heat dissipation in a second direction that extends transverse to the first direction and the axis;

the body is configured to promote heat dissipation in a third direction which extends parallel to the axis; and the body includes a heat conducting connector for connecting said one or more cells to the first heat conducting layer thereby forming a second heat dissipation path that at least partially extends in the third direction; and wherein the first direction, the second direction and the third direction extend transverse to one another.

2. The energy storage module as claimed in claim 1, wherein the second heat conducting layer is the only layer between the cavity and the first heat conducting layer.

3. The energy storage module as claimed in claim 1, wherein the second heat conducting layer is electrically insulating.

4. The energy storage module as claimed in claim 1, wherein the heat conducting connector includes a coupling portion for coupling with the first heat conducting layer, at least the coupling portion is electrically insulating.

5. The energy storage module as claimed in claim 1, wherein the heat conducting connector includes an electrically conducting portion for establishing direct connection with said one or more cells.

6. The energy storage module as claimed in claim 1, wherein the body includes a third wall arranged parallel to the first wall, the third wall includes first and second heat conducting layers to form part of the first heat dissipating path in the first direction.

7. The energy storage module as claimed in claim 6, wherein the body includes a heat conducting connector for connecting said one or more cells to the first heat conducting layer thereby forming a second heat dissipation path that at least partially extends in the third direction.

8. The energy storage module as claimed in claim 7, wherein the heat conducting connector includes an electrically conducting portion sandwiched between two coupling portions that are electrically insulating.

9. The energy storage module as claimed in claim 1, wherein the heat conducting connector is in fixed connection with the first heat conducting layer.

10. The energy storage module as claimed in claim 1, wherein the first heat conducting layer is formed from metal.

11. The energy storage module as claimed in claim 1, wherein the second heat conducting layer is formed from a material selected from a group consisting of silicone, heat conductive rubber and a mixture thereof.

12. The energy storage module as claimed in claim 1, wherein the second heat insulating layer is formed from a material selected from a group consisting of Bakelite, glass fiber, foam, inorganic composite material and a mixture thereof.

13. The energy storage module as claimed in claim 1, wherein the first wall is in connection with a fluid heat exchanger for facilitating heat dissipation from the first wall.

14. An energy storage module comprising:

a frame;

a plurality of cells arranged in the frame, the cells being in face-wise contact with each other to form a stack;

wherein the frame includes a heat dissipation structure in contact with each of the cells to facilitate heat transfer between the cells and the frame along a first direction, a heat insulation structure in face-wise contact with the two outer-most cells of the stack to prevent heat transfer between the cells and the frame in a second direction different from the first direction, and the body is configured to promote heat dissipation in a third direction which extends parallel to the axis; and the body includes a heat conducting connector for connecting said one or more cells to the first heat conducting layer thereby forming a second heat dissipation path that at least partially extends in the third direction; and wherein the first direction, the second direction and the third direction extend transverse to one another.

15. The energy storage module as claimed in claim 14, wherein the first direction and the second direction are substantially orthogonal.

16. The energy storage module as claimed in claim 14, wherein the heat dissipation structure comprises: a thermally conductive wall with one or more material layers; a heat sink; or both.

17. The energy storage module as claimed in claim 14, wherein the heat insulation structure comprises a pair of thermally insulating walls one adjacent each of the two outer-most cells of the stack, each of the thermally insulating wall including one or more material layers.

18. The energy storage module as claimed in claim 14, wherein the cells are pouch cells.

* * * * *